(12) United States Patent
Townsend et al.

(10) Patent No.: US 7,198,224 B2
(45) Date of Patent: Apr. 3, 2007

(54) ENERGY ABSORBING AIRFRAME FOR A VERTICAL LIFT VEHICLE

(75) Inventors: William Townsend, Stratford, CT (US); Bruce Fredric Kay, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 183 days.

(21) Appl. No.: 11/064,612

(22) Filed: Feb. 24, 2005

(65) Prior Publication Data

US 2006/0243854 A1    Nov. 2, 2006

(51) Int. Cl.
*B64C 1/06*    (2006.01)
*B64C 27/02*    (2006.01)

(52) U.S. Cl. .................. 244/17.11; 244/54; 244/119; 244/120; 244/17.27

(58) Field of Classification Search .......... 244/17.11, 244/17.17, 17.27, 54, 119, 112; 416/138
See application file for complete search history.

(56) References Cited

U.S. PATENT DOCUMENTS

| | | | |
|---|---|---|---|
| 2,487,646 A * | 11/1949 | Gluhareff ................. 244/17.11 |
| 2,535,164 A * | 12/1950 | Seibel ..................... 244/17.11 |
| 3,845,917 A * | 11/1974 | Drees ...................... 244/17.27 |
| 3,966,147 A | 6/1976 | Wittko et al. |
| 4,430,045 A * | 2/1984 | Cresap ....................... 416/138 |
| 4,523,730 A | 6/1985 | Martin |
| 4,811,921 A | 3/1989 | Whitaker et al. |
| 4,887,782 A | 12/1989 | Carnell et al. |
| 5,069,318 A | 12/1991 | Kulesha et al. |
| 5,125,598 A | 6/1992 | Fox |
| 5,154,371 A * | 10/1992 | Grant et al. ............. 244/17.27 |
| 5,431,361 A | 7/1995 | Carnell et al. |
| 5,451,015 A | 9/1995 | Cronkhite et al. |
| 6,286,782 B1 * | 9/2001 | Bansemir et al. ........ 244/17.11 |
| 6,427,945 B1 | 8/2002 | Bansemir |
| 6,830,286 B2 | 12/2004 | Bechtold et al. |

\* cited by examiner

*Primary Examiner*—Galen Barefoot
(74) *Attorney, Agent, or Firm*—Carlson, Gaskey & Olds (57) ABSTRACT

An airframe includes an energy absorbing structure with a frame, a beam mounted to the frame at a rotational joint and a collapsible member. In response to reaching a predetermined threshold load value during a high sink rate impact event, the collapsible member will collapse under an aft section of the upper deck. The rotational joint operates as a virtual hinge such that a forward section of the upper deck deforms in a predictable manner. As the upper deck supports the high mass systems, the high mass components are less likely to separate from their mounting and penetrate into the crew compartment and the main rotor system will tilt aft away from the crew compartment to minimize the likelihood that the rotor blades may penetrate the crew compartment.

23 Claims, 13 Drawing Sheets

ENERGY ABSORBING AIRFRAME FOR A VERTICAL LIFT VEHICLE

This invention was made with government support under Contract No.: DAAH10-03-02-0003 awarded by the Department of the Army. The government therefore has certain rights in this invention.

BACKGROUND OF THE INVENTION

The present invention relates to an airframe, and more particularly to an airframe structure which attenuates energy during a high sink rate impact event and minimizes the potential that high mass components may enter the crew compartment.

In order to survive high sink rate impacts, helicopters typically utilize a combination of landing gear, fuselage crushing and seat stroking to attenuate energy. While the landing gear is a primary element in attenuating energy in impacts, there are conditions when the landing gear may be rendered ineffective, such as water landings, rough terrain, and when the gear is retracted. In these scenarios, the aircraft fuselage is the primary energy attenuation structure.

The fuselage attenuates energy through various forms of structural deformation which is dependent upon material elongation and strength properties. Failure modes such as buckling, tearing, crippling, stretching, shearing all absorb energy, but these modes may be relatively inefficient, and difficult to predict. One particular complexity with a helicopter is that high mass systems such as engines, transmissions, main rotor systems, etc. are typically located above the crew and passenger compartments. Deceleration forces during an impact event may cause the high mass systems to separate from their mounting points and enter the occupied compartments.

Historical experience shows that conventional fuselage designs have inherent energy absorption capability. This energy absorption capability is exploited in the overall helicopter system crashworthiness design. However, during the aircraft life cycle, aircraft weight typically grows to accommodate updated systems such that he fuselage structure is reinforced to support the extra weight. The reinforced structure typically becomes stiffer which may reduce structural deformation of the fuselage which in turn may induce higher deceleration forces during an impact event. Higher deceleration forces may increase the likelihood that the high mass systems will separate from the mounting points and enter the occupied compartments. The net result may be a decrease in crashworthiness capability of the fuselage.

Accordingly, it is desirable to provide an airframe which attenuates energy during a high sink rate impact event, that is generally independent of structural stiffness and minimizes the potential that high mass components may enter a crew compartment.

SUMMARY OF THE INVENTION

An airframe includes an energy absorbing structure according to the present invention located generally above the occupied compartments. The energy absorbing structure generally includes a frame, a beam mounted to the frame at a rotational joint and a collapsible member. The beam is oriented generally parallel to an aircraft longitudinal axis to at least partially support and/or form a portion of an upper deck. High mass systems are at least partially supported by the upper deck.

Each beam is mounted to the frame through the rotational joint. Opposite the rotational joint and to the rear of the crew compartment the upper deck is supported upon the collapsible member. The collapsible member provides structural support for the upper deck as a portion of the airframe during normal operational conditions but is designed to collapse in a controlled manner after a predetermined threshold load value is reached such as that which occurs during a high sink rate impact event.

In response to reaching the predetermined threshold load value during a high sink rate impact event, the collapsible member will collapse under the aft section of the upper deck and the rotational joint will operate as a virtual hinge such that a forward section of the upper deck deforms in a predictable manner to form the rotational joint. As the upper deck supports the high mass systems, the high mass components will move with the upper deck in a controlled manner during the impact event. As the collapsible members collapse, the high mass components are less likely to separate from their mounting and penetrate into the crew compartment. The main rotor system will also tilt aft away from the crew compartment when the upper deck articulates such that the main rotor blades will more likely impact the extended tail and minimize the likelihood that the rotor blades may penetrate the crew compartment.

The present invention therefore provides an airframe which attenuates energy during a high sink rate impact event, is generally independent of structural stiffness and minimizes the potential that high mass components may enter a crew compartment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
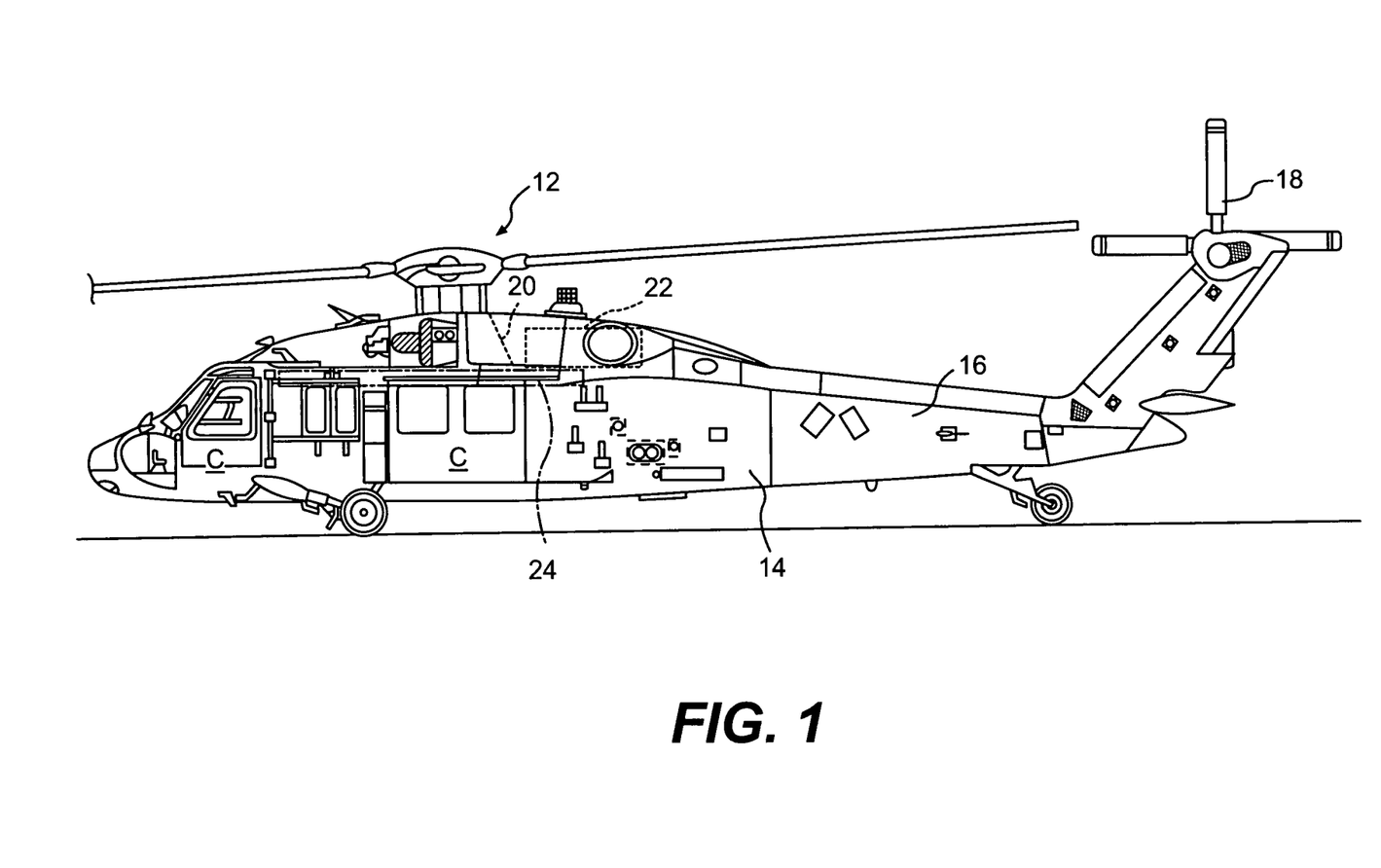
FIG. 1 is a general side view of an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22.

The main rotor assembly 12, transmission 20 and the engines 22 are high mass systems mounted to an upper deck 24 (FIG. 2A) at mount locations 25 (FIG. 2B) which is located generally above a crew compartment C. It should be understood that "crew component" as utilized herein refers to both the cockpit and the passenger cabin but primarily to the cockpit. It should be understood that the term "upper deck' as utilized herein may include a multiple of airframe structures which at least partially provide support the high mass components and which is located at least partially above the crew compartment C. Although a particular helicopter configuration is illustrated in the disclosed embodiment, other machines such as turbo-props, tilt-rotor and tilt-wing aircraft will also benefit from the present invention.

Figure 2A:
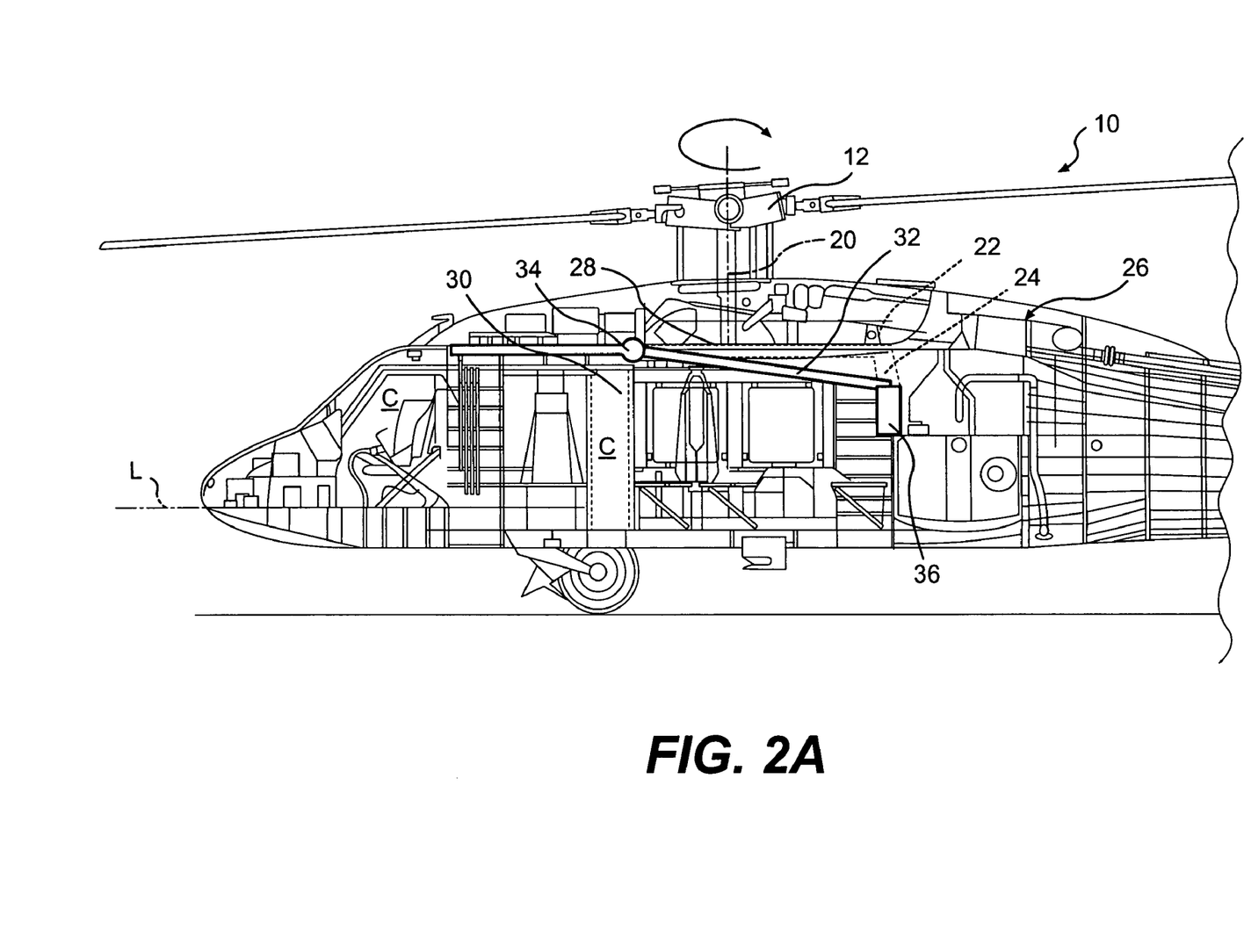
FIG. 2A is a general side view of an exemplary rotary wing airframe.
Figure 2B:
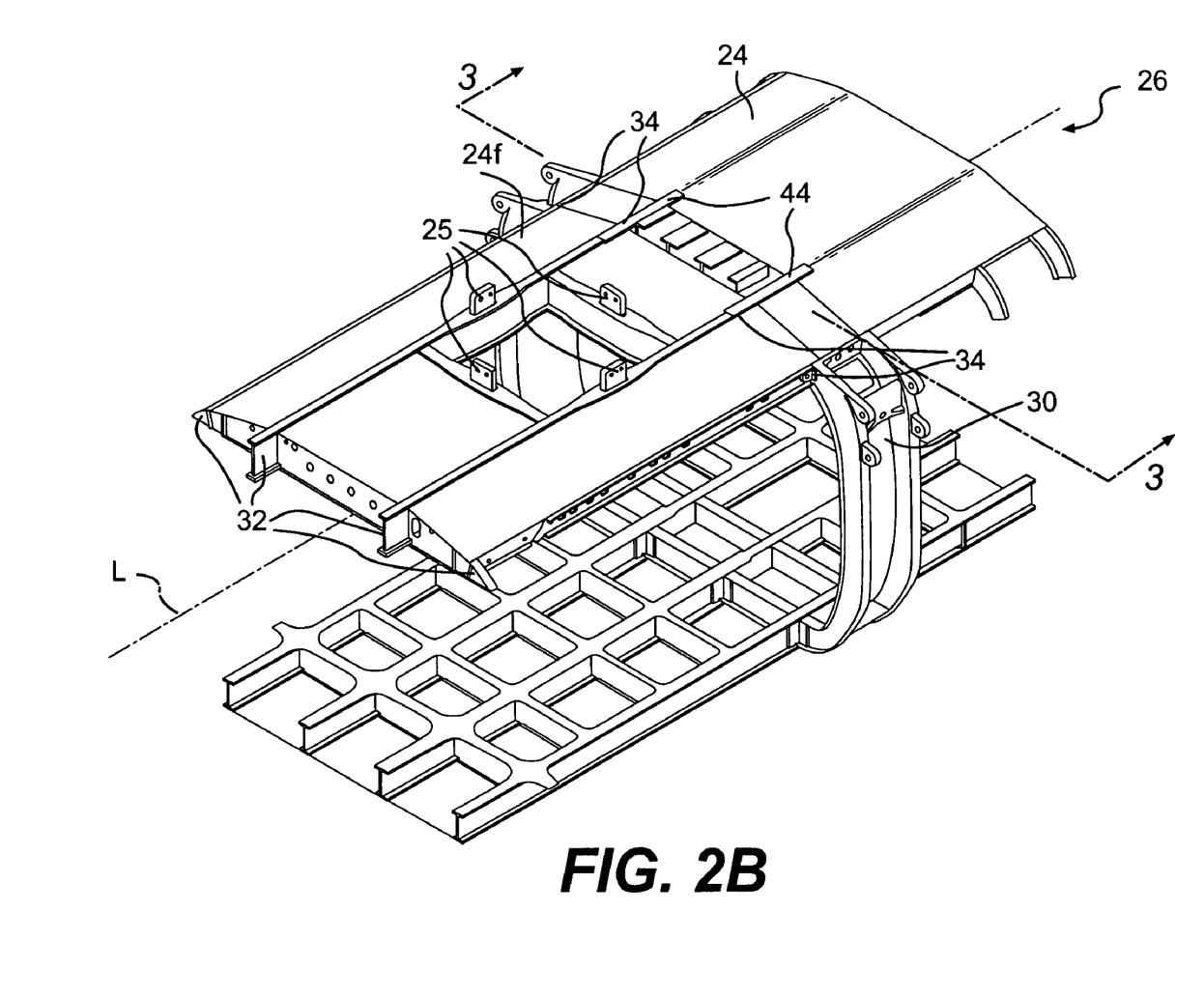
FIG. 2B is a general perspective view of the exemplary rotary wing airframe of FIG. 2A.
Figure 3:
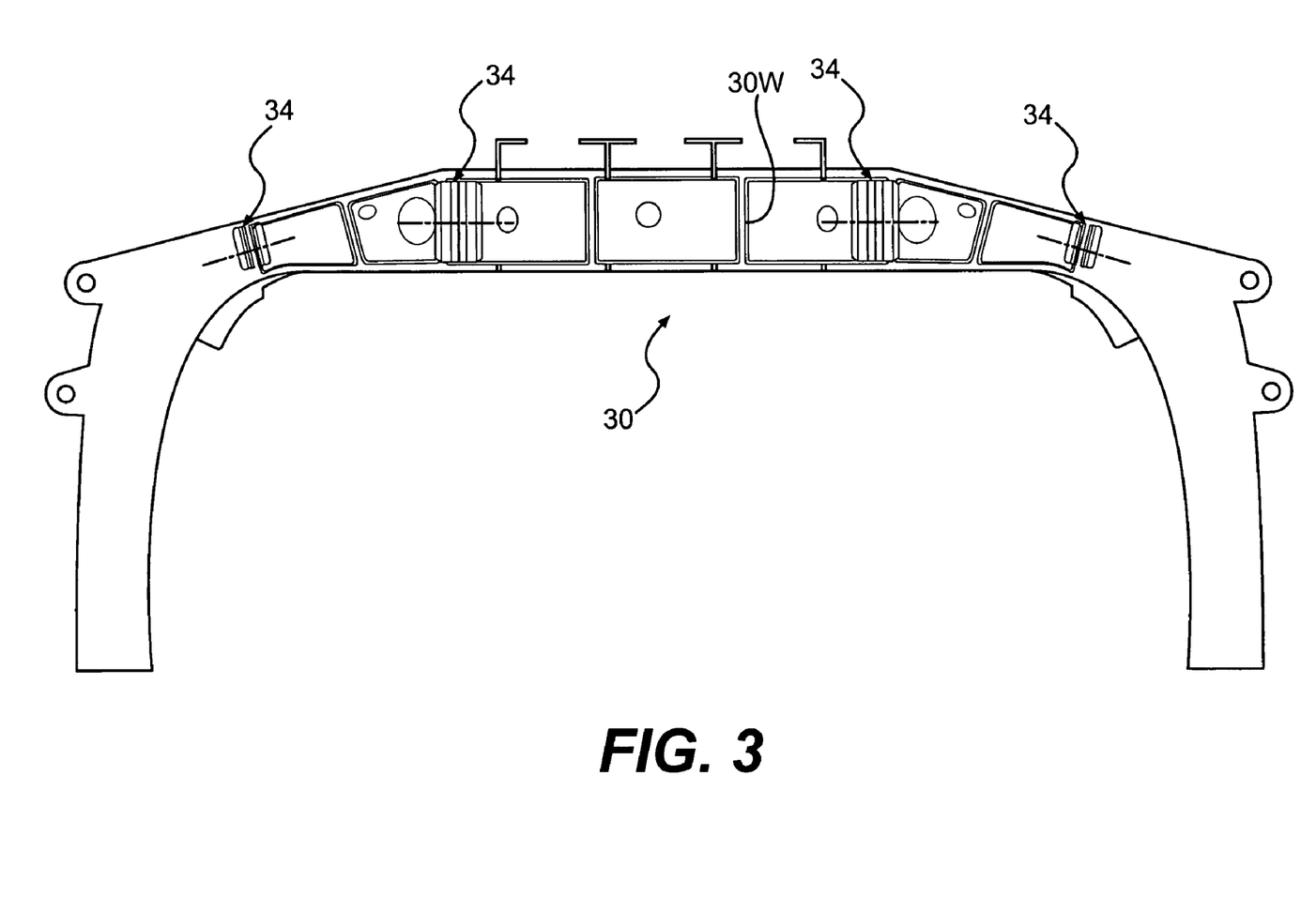
FIG. 3 is a rear view of a frame for use with a rotary wing airframe.

Referring to FIG. 2A, an airframe 26 of the aircraft 10 includes an energy absorbing structure 28 located generally above the crew compartment C. The energy absorbing structure 28 generally includes a frame 30, a beam 32 mounted to the frame 30 at a rotational joint 34 and a collapsible member 36. The frame 30 is generally transverse to a longitudinal axis L of the aircraft 10 and may include a multiple of webs 30w (also illustrated in FIG. 3). The frame 30 is preferably designed to react impact loads but not fail. That is, the frame 30 generally survives intact during an impact event. It should be understood that various frames and bulkheads may be utilized with the present invention.

The beam 32 is oriented generally parallel to the longitudinal axis L to at least partially support and/or form a portion of the upper deck 24. The beam 32 is of a generally I-beam shape, however, other shapes are also usable with the present invention. Typically, the beam webs are sized for the shear load and the caps are sized to carry the bending moment. Although only a single beam 32 is illustrated it should be understood that a multiple of beams are located transverse to the frame 30 to support and/or form the upper deck 24. The high mass systems 12, 20, 22 are at least partially supported by the upper deck 24.

Each beam 32 of the upper deck 24 is mounted to the frame 30 through the rotational joint 34. Opposite the rotational joint 34 and preferably to the rear of the crew compartment C the upper deck 24 is supported upon the collapsible member 36. The collapsible member 36 is a dedicated energy attenuator mounted within the airframe 26. The collapsible member 36 provides structural support for the upper deck 24 as a portion of the airframe 26 during normal operational conditions but is designed to collapse in a controlled manner after a predetermined threshold load value is reached such as that which will occur during a high sink rate impact event. Such a predetermined threshold load value contemplates that which will occur under conditions when the landing gear may be rendered ineffective, such as water landings, rough terrain, and when the gear is retracted.

The collapsible member 36 provides a highly efficient and controlled energy absorption as compared to conventional airframe structure. In other words, the collapsible members 36 are designed to react in a particular predetermined manner in response to predetermined threshold load values. The collapsible member 36 will also respond in the same predictable manner irrespective of growth in the aircraft weight during the aircraft life cycle. A variety of energy absorbing components may be utilized as the collapsible members in accordance with the present invention such as crushing core materials (ex; honeycomb or foam), extruding concentric telescoping tubes, fragmenting, shredding column strut members, inverting collapsible tubes, forming accordion-like buckles and such like structures. It should be understood that airframe sections adjacent the collapsible member 36 also collapse or deform such that operation of the collapsible member 36 is not interfered with.

Figure 4A:
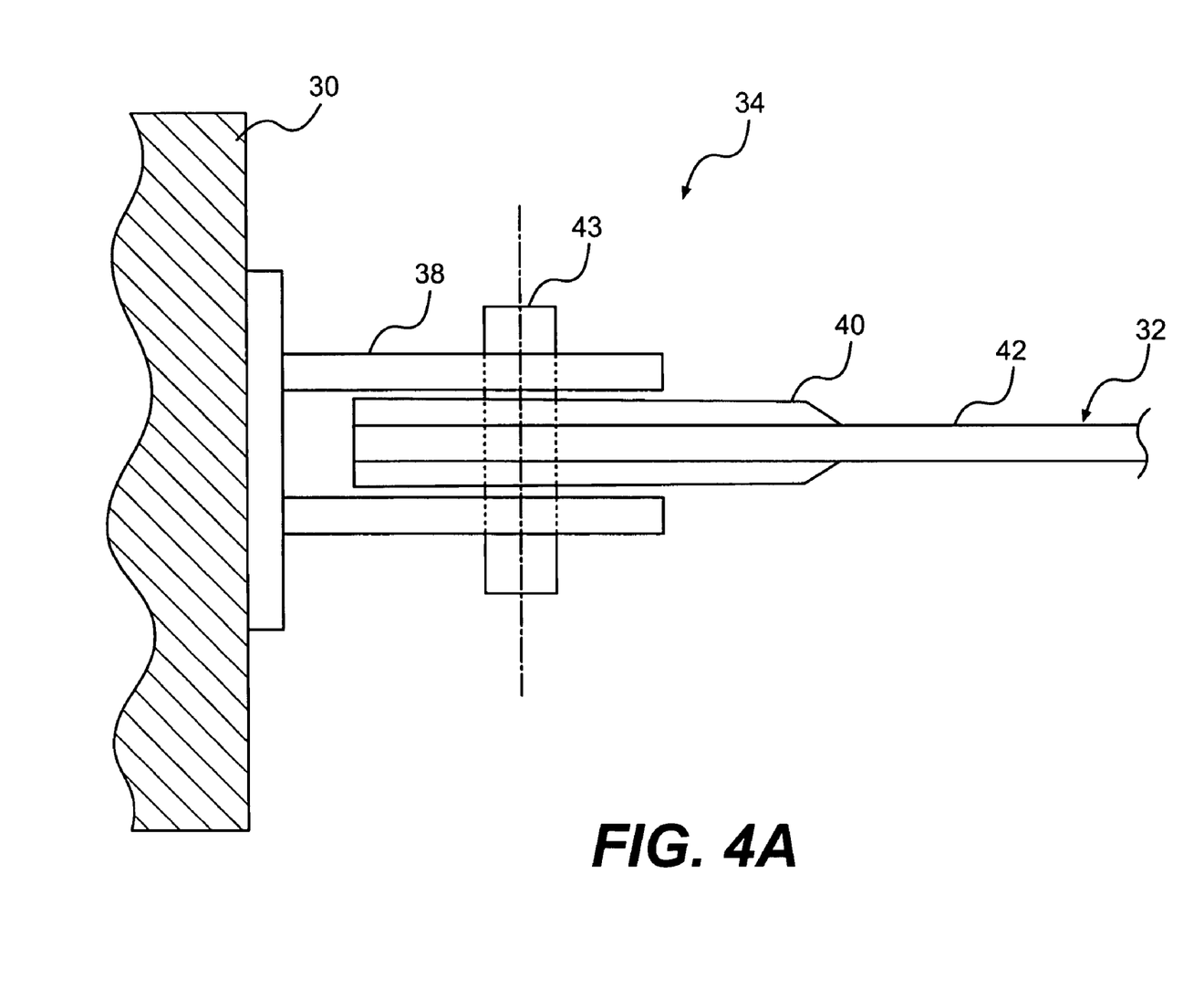
FIG. 4A is a top view of a rotational joint for an energy absorbing structure according to the present invention.
Figure 4B:
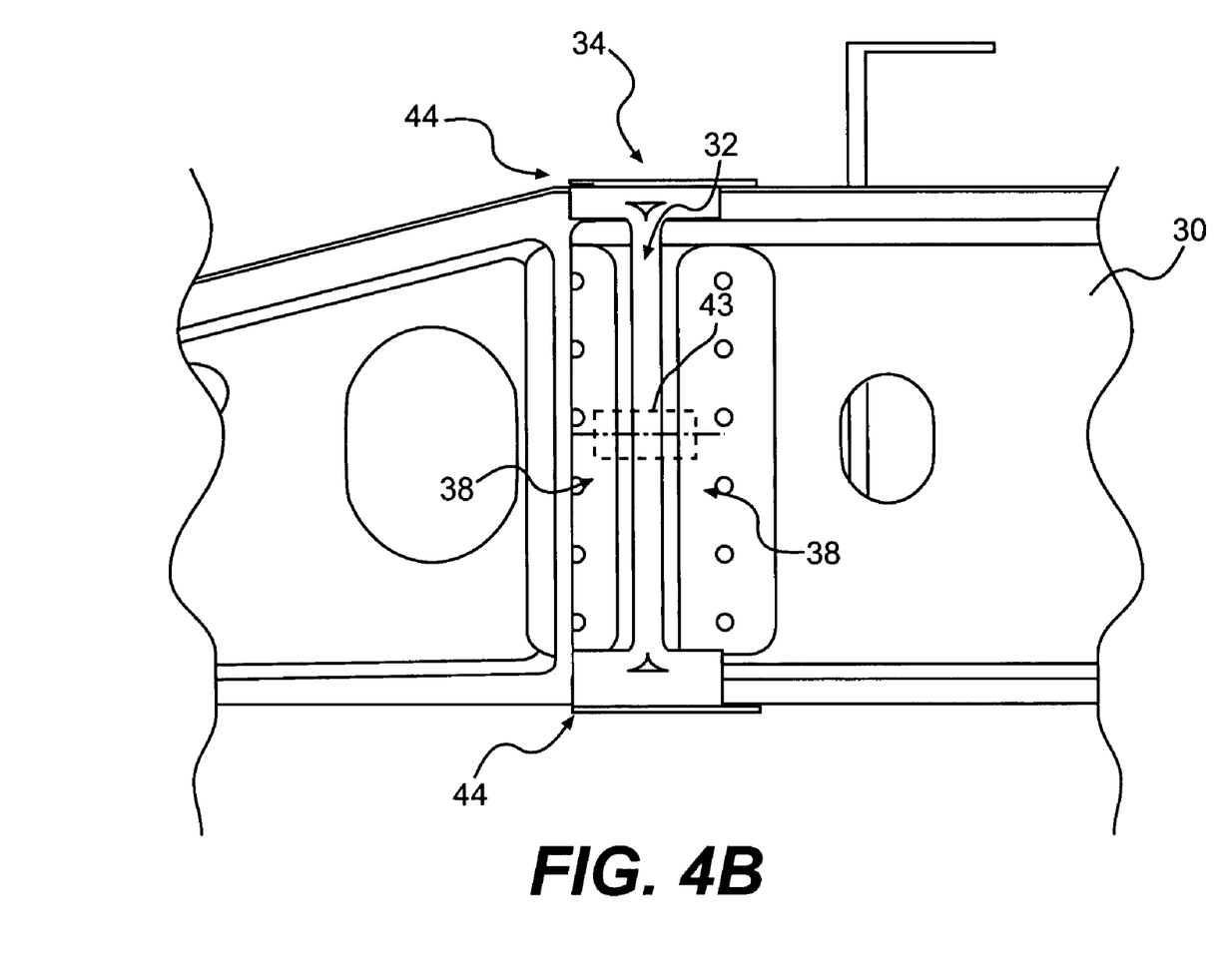
FIG. 4B is a front view of a rotational joint for an energy absorbing structure according to the present invention.
Figure 5:
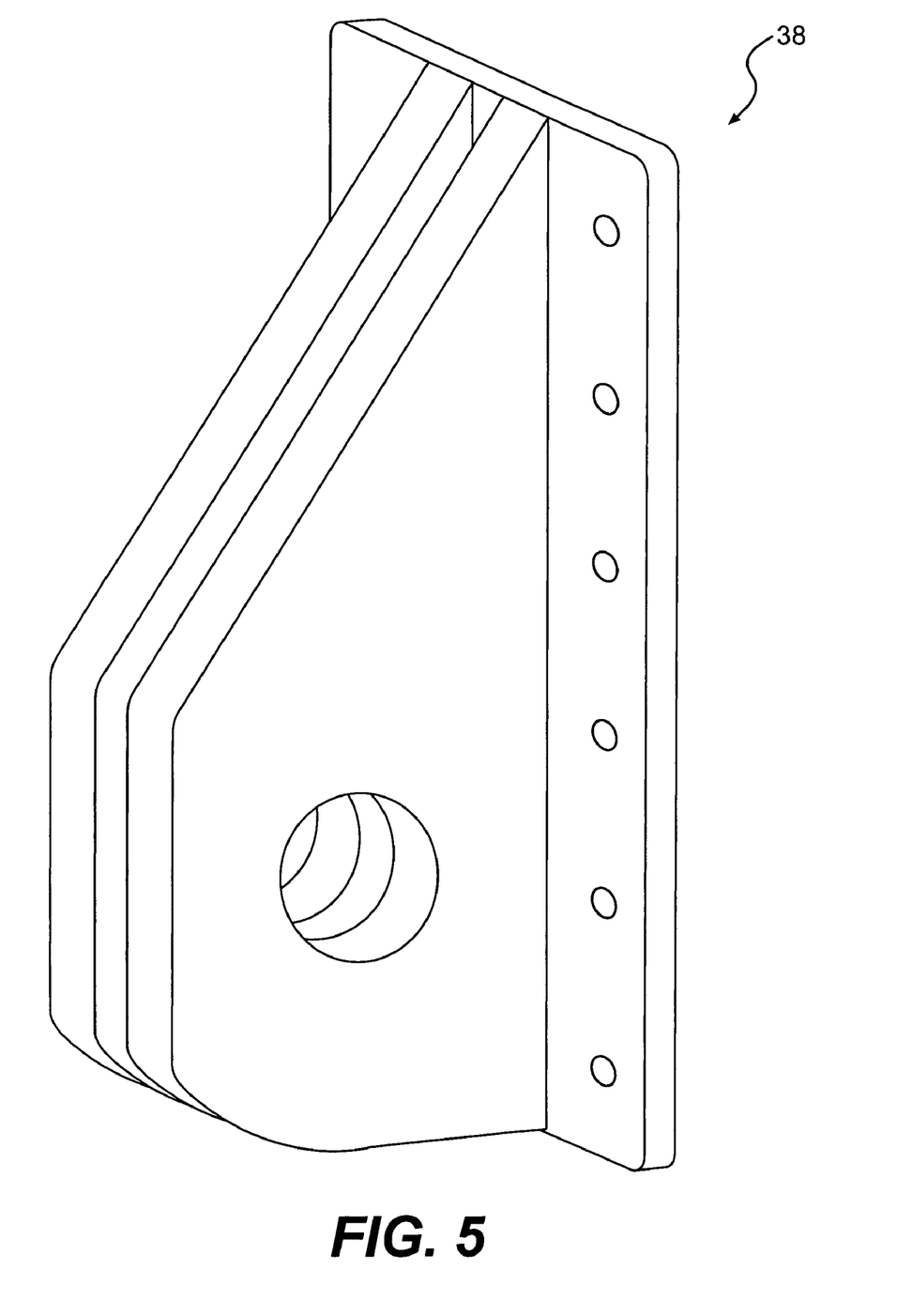
FIG. 5 is a perspective view of a hinge fitting of the rotational joint of FIG. 4.
Figure 6:
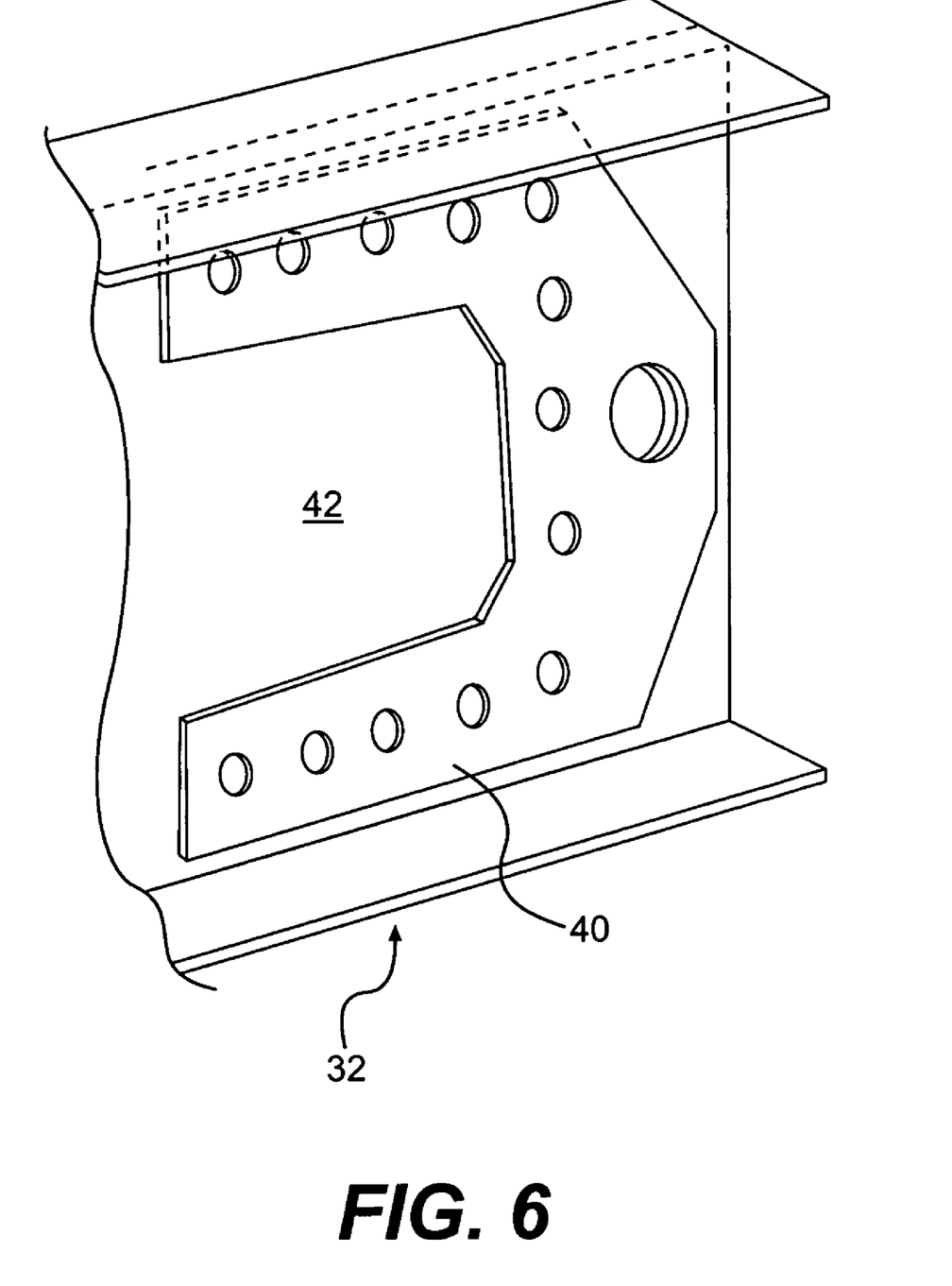
FIG. 6 is a perspective view of a beam web doubler of the rotational joint of FIG. 4.
Figure 7:
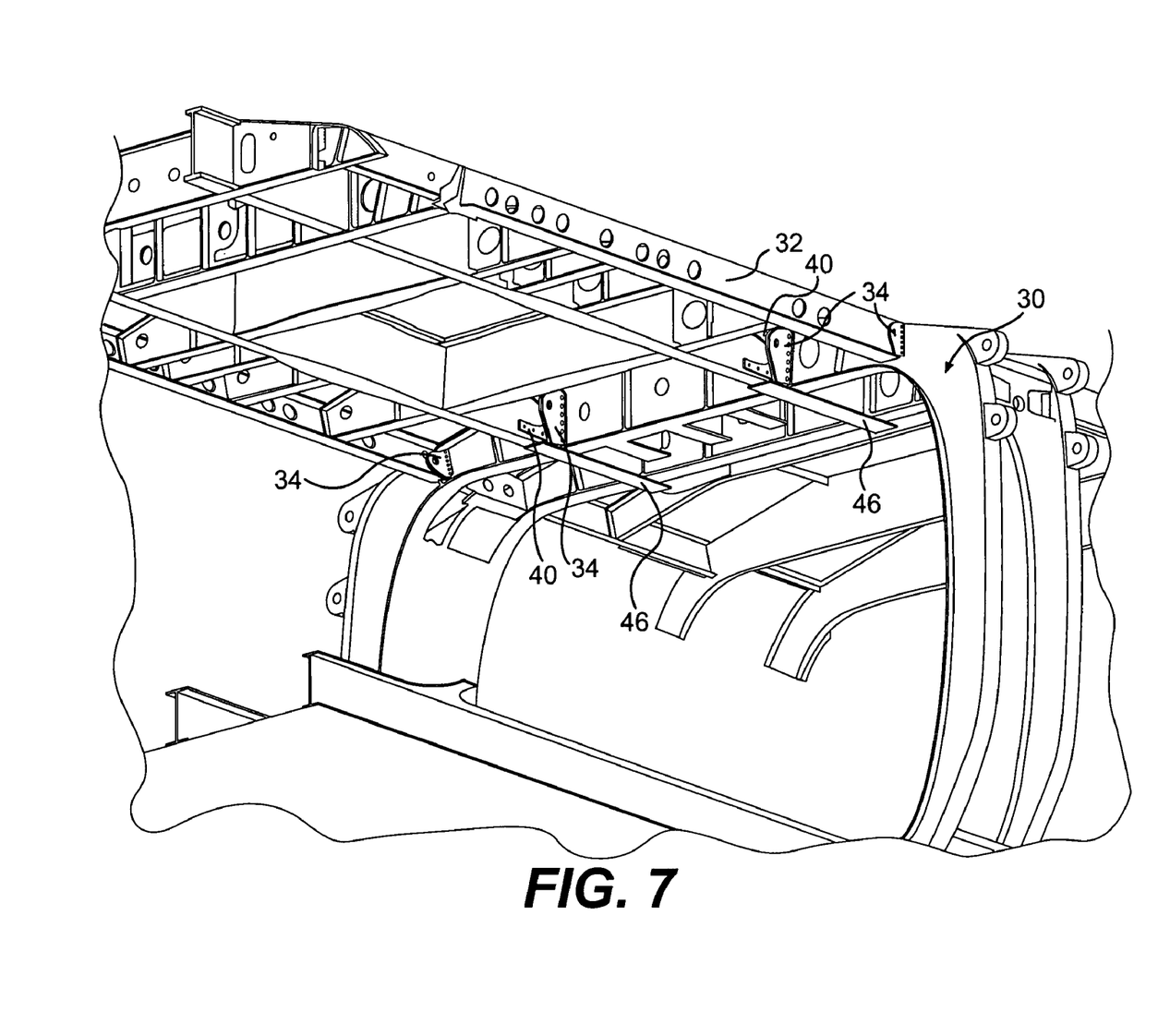
FIG. 7 is a rear perspective view of a rotational failure location for rotary wing airframe.

Referring to FIGS. 4A and 4B, one type of the rotational joint 34 generally includes a hinge fitting 38 (also illustrated in FIG. 5) mounted to the frame 30, a web doubler 40 (also illustrated in FIG. 6) mounted to a web 42 of the beam 32 and a pin 43 which passes through the hinge fitting 38, the web doubler 40 and the web 42 to provide a predetermined rotational failure location along the rotational joint 34 (also illustrated in FIG. 7). The hinge fitting 38 is preferably attached to the frame 30 through fasteners, welding, bonding or the like. The web doubler 40 may be mounted to the beam through fasteners, welding, bonding or may be formed integrally into the web of the beam 32 to provide a lug which pivots about the pin 43. It should be understood that the rotational failure location would not be along a single line as shown in FIG. 7, but may be independent for each beam 32. Furthermore, the rotational failure location need not be horizontal but may be canted such that the beams 32 may rotate outside of an X–Z plane.

Figure 8A:
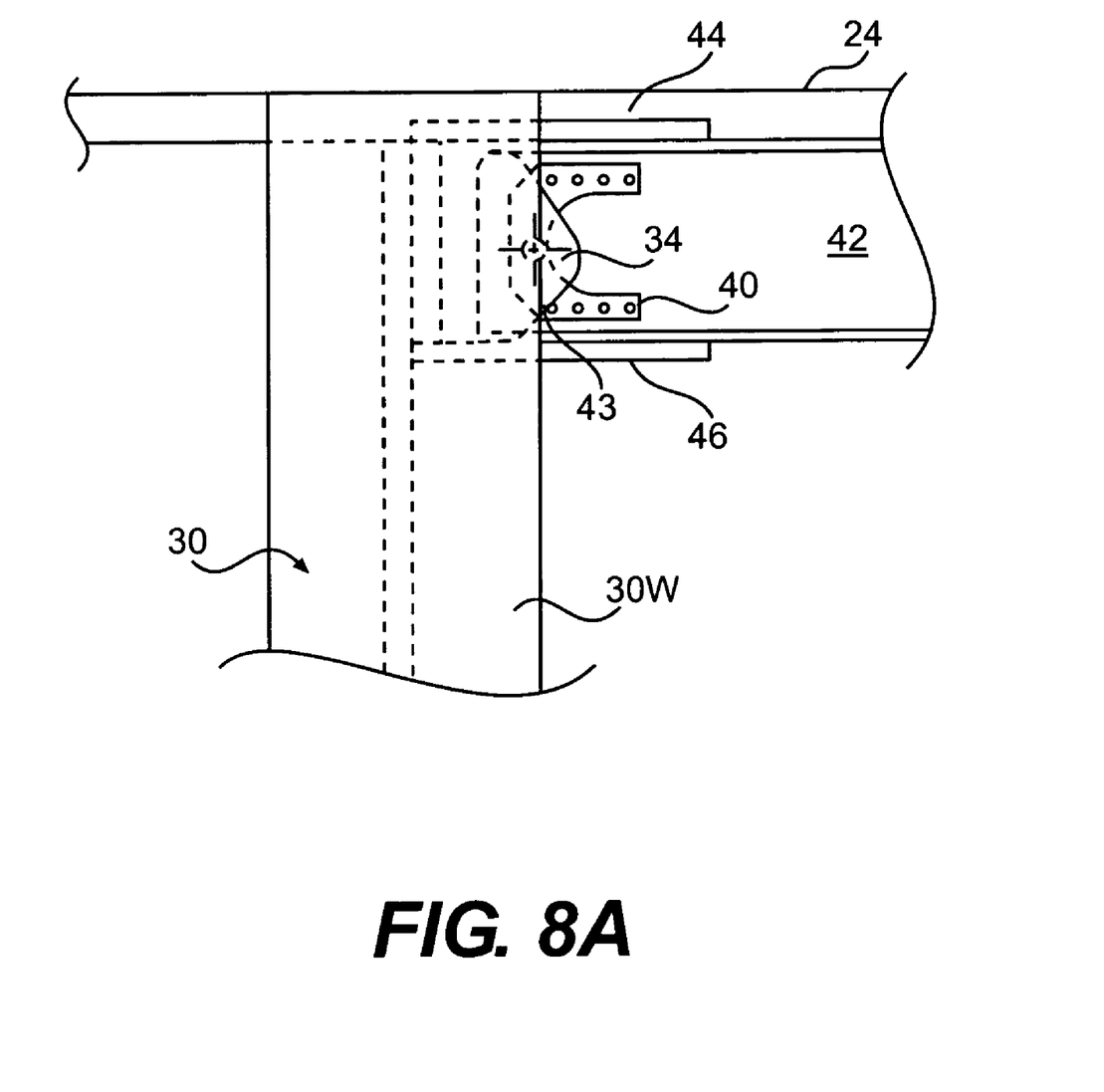
FIG. 8A is an expanded side view of a rotational joint for an energy absorbing structure according to the present invention prior to an impact event.
Figure 8B:
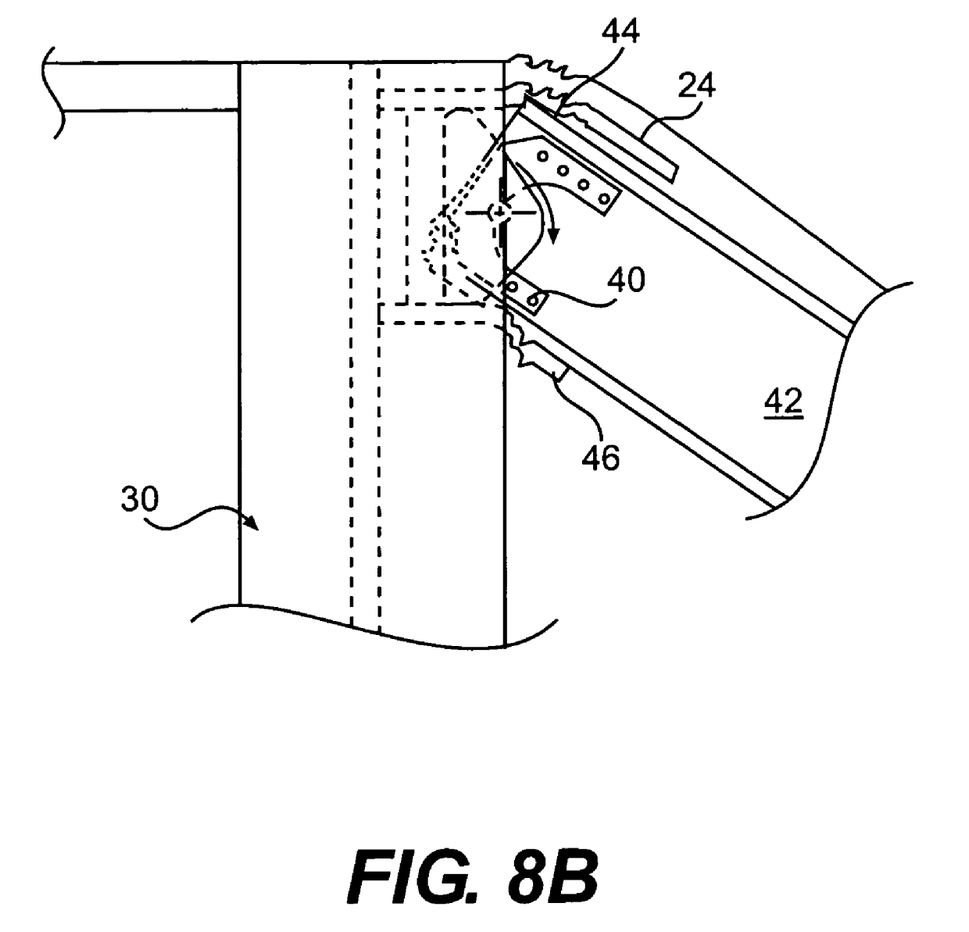
FIG. 8B is an expanded side view of a rotational joint for an energy absorbing structure according to the present invention after an impact event.

Referring to FIGS. 8A and 8B, an upper strap 44 and a lower strap 46 may additionally be attached to the frame 30 and the beam 32 across the rotational joint 34 through fasteners, welding, bonding or the like. The straps 44, 46 react shear loads and transfer beam cap loads during normal operation. The straps 44, 46 will fail (FIG. 8B), however, in response to the predetermined threshold load value from a high sink rate impact event.

Figure 9A:
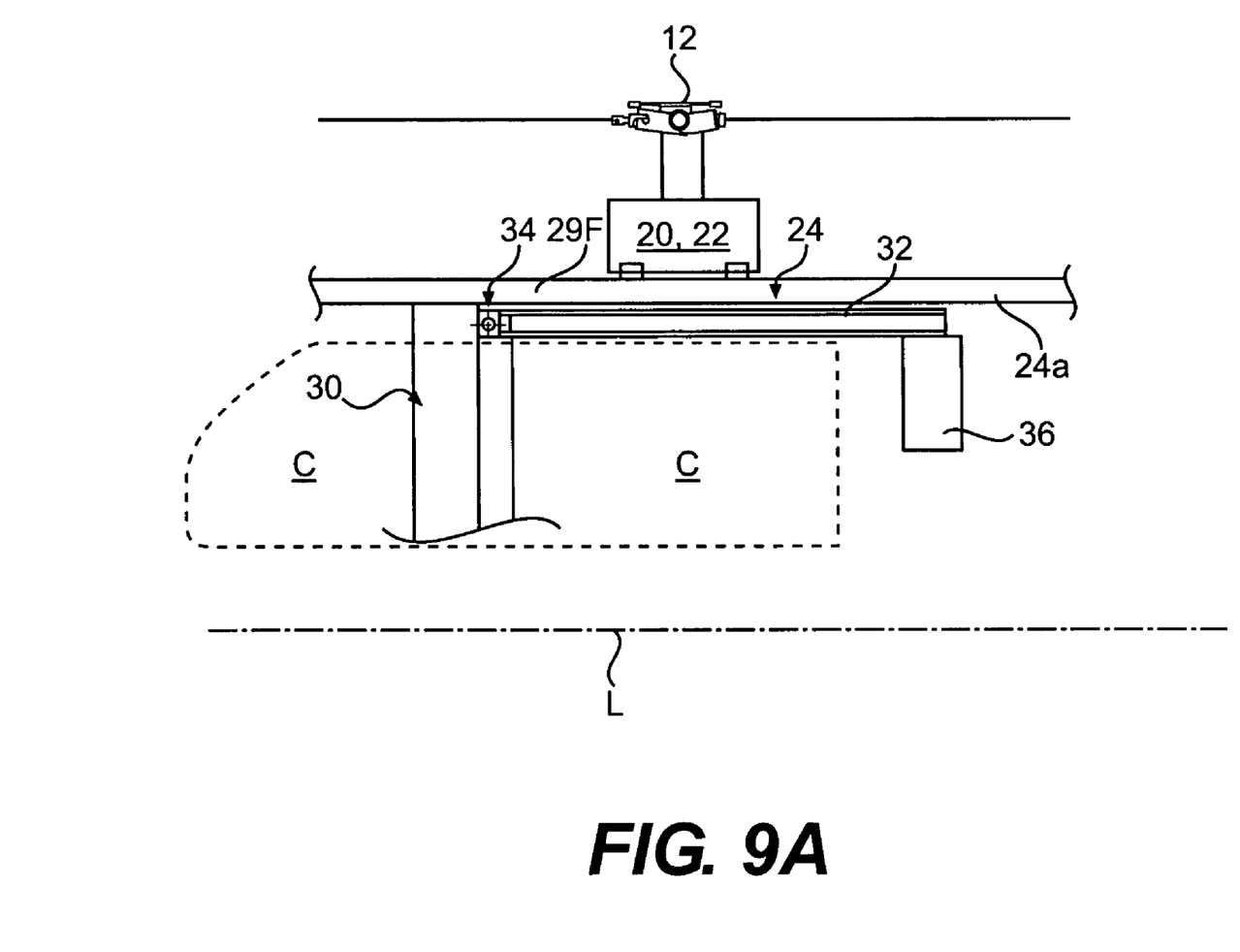
FIG. 9A is a side view of an energy absorbing structure relative to a an aircraft crew compartment prior to an impact event.
Figure 9B:
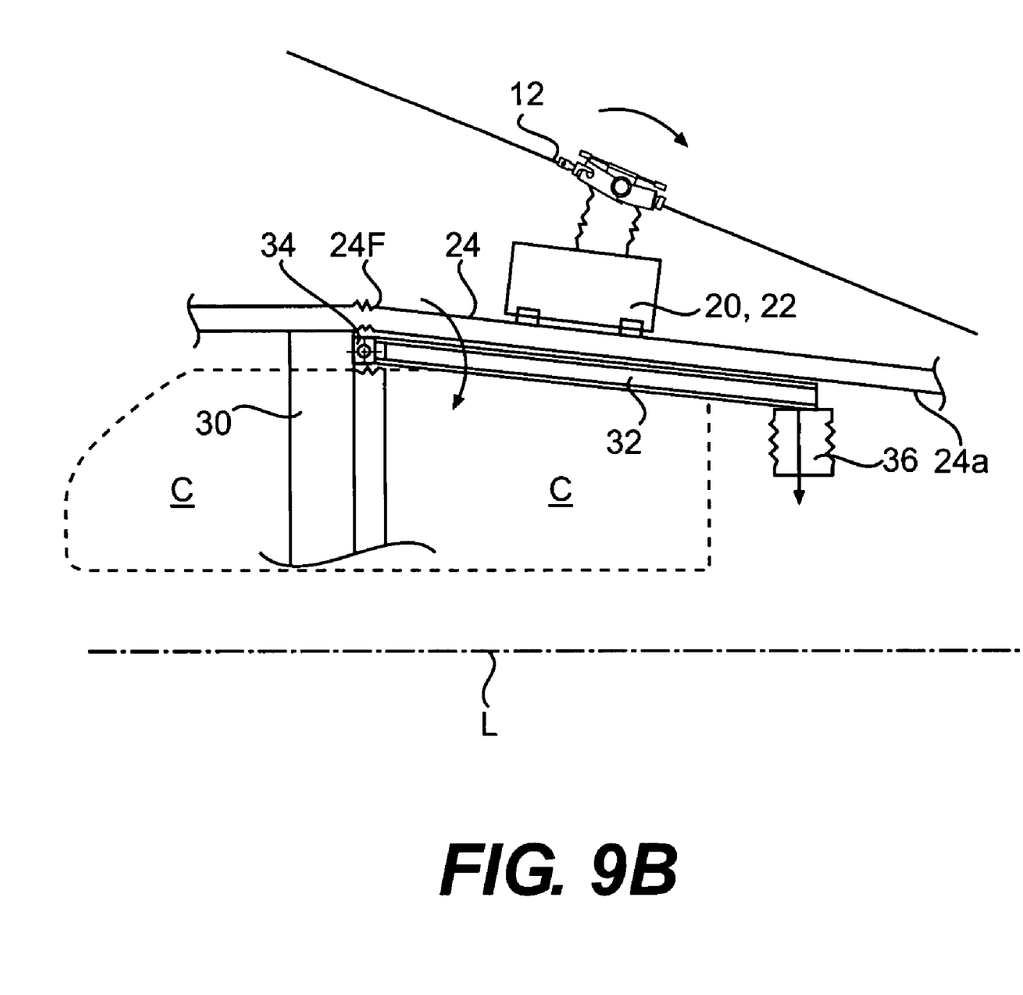
FIG. 9B is an expanded side view of an energy absorbing structure relative to an aircraft crew compartment after an impact event.

Referring to FIGS. 9A and 9B, in response to reaching the predetermined threshold load value from a high sink rate impact event, the collapsible member 36 will collapse under the aft section of the upper deck and the rotational joint 34 will operate as a virtual hinge such that a forward section 24F of the upper deck 24 adjacent the frame 30 deforms in a predictable manner to form the a predetermined rotational failure location such that an aft section 24a articulates downward. In other words, a large controlled deformation is designed into the airframe by the rotational joint 34 which lengthens the time of the impact event for the high mass systems to provide a net reduction in g-forces applied thereto.

As the upper deck 24 supports the high mass systems 12, 20, 22, the high mass components will move with the upper deck 24 to at least partially control deceleration during an impact event. The controlled deceleration is provided by the collapsible members 36 such that the high mass systems are less likely to separate from their mounting and penetrate into the crew compartment C. The controlled deformation also translates into weight savings in the structural design compared to conventional designs in which buckling, tearing, crippling, stretching, and shearing failure modes are relatively inefficient, and difficult to predict.

As the upper deck 24 tilts rearward, the main rotor system 12 will also tilt aft away from the crew compartment C and primarily away from the aircrew such that the main rotor blades will more likely impact the extended tail 16 to minimize the likelihood that the rotor blades may penetrate the crew compartment.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of enabling energy attenuation during an impact event comprising the steps of:
    providing an airframe structure capable of at least partially plastically deforming about a rotational failure location about which the airframe structure hinges in response to an impact event above a predetermined severity.

2. A method as recited in claim 1, further comprises the steps of:
    (a) providing a collapsible structure capable of at least partially supporting the airframe structure prior to the impact event; and
    (b) collapsing the collapsible structure in response to the impact event.

3. A method as recited in claim 1, further comprises the step of:
    pivoting an upper deck of the airframe structure about a pin mounted within a rotational hinge at the rotational failure location.

4. A method as recited in claim 3, further comprises the step of:
    tilting an aft section of the airframe structure aft of said pin away from an operational generally horizontal orientation in response to the impact event.

5. A method as recited in claim 1, further comprises the step of:
    supporting a high mass system with the airframe structure; and
    articulating the high mass system with the airframe structure in response to the impact event.

6. A method as recited in claim 1, further comprises the step of:
    supporting a main rotor system with the airframe structure; and
    tilting the main rotor system away from a crew compartment with the airframe structure in response to the impact event.

7. A method as recited in claim 1, further comprises the steps of:
    (a) supporting a main rotor transmission with the airframe structure aft of the rotational failure location and generally above a crew compartment; and
    (b) articulating the main rotor transmission with the airframe structure in response to the impact event.

8. A method of energy attenuation during an impact event comprising the steps of:
    (1) defining a rotational failure location for an upper deck of an airframe structure about which the airframe structure hinges such that the upper deck is capable of at least partially plastically deforming about the rotational failure location in response to an impact event above a predetermined severity.

9. A method as recited in claim 8, wherein said step (2) further comprises:
    providing selective support for the upper deck with a collapsible member adjacent to an aft section of the upper deck such that the collapsible member is capable of collapsing in response to the impact event as the upper deck is at least partially plastically deforming about the rotational failure location.

10. A method as recited in claim 8, further comprises the step of:
    articulating a high mass system with the upper deck in response to the impact event.

11. An aircraft airframe comprising:
    a frame member;
    a beam mounted generally transverse to said frame member at a rotational failure location about which the frame member is capable of hinging relative the frame member; and
    a collapsible member mounted adjacent said beam capable of collapsing in response to an impact event above a predetermine severity such that upon such impact event said beam at least partially plastically deforms about said rotational failure location in response to the impact event.

12. The airframe as recited in claim 11, wherein said rotational failure location includes a rotational joint defined by a hinge mounted to the frame member and a pin located through said hinge and said beam.

13. The airframe as recited in claim 12, further comprising a doubler mounted to a web of said beam, said pin located through said web and said doubler.

14. The airframe as recited in claim 11, further comprising a strap mounted to the frame member and said beam across said rotational failure location, said strap at least partially plastically deforming about said rotational failure location in response to the impact event.

15. The airframe as recited in claim 11, wherein said collapsible member includes a collapsible tube which at least partially supports said beam prior to the impact event.

16. The airframe as recited in claim 11, wherein said beam forms at least a portion of an upper deck above a crew compartment, at least one of said frame member and said beam at least partially plastically deforms about said rotational failure location in response to the impact event.

17. The airframe as recited in claim 16, further comprising a high mass system supported by said upper deck.

18. The airframe as recited in claim 16, wherein said beam is mounted at least partially above said crew compartment, said rotational failure location forward of said crew compartment.

19. The airframe as recited in claim 18, further comprising a main rotor system at least partially supported by said beam, said main rotor system capable of tilting away from a pilot compartment forward of said crew compartment in response to at least partial plastic deformation of said beam about said rotational failure location in response to said impact event.

20. The airframe as recited in claim 11, further comprising a main rotor assembly with the airframe structure aft of the rotational failure location and generally above a crew compartment.

21. The airframe as recited in claim 11, further comprising a transmission with the airframe structure aft of the rotational failure location and generally above a crew compartment.

22. The airframe as recited in claim 11, wherein at least a segment of said beam is in a first position to said frame member prior to the impact event.

23. The airframe as recited in claim 22, wherein said segment is in a second position after the impact event, said second position being a plastically deformed position.

* * * * *